UNITED STATES PATENT OFFICE.

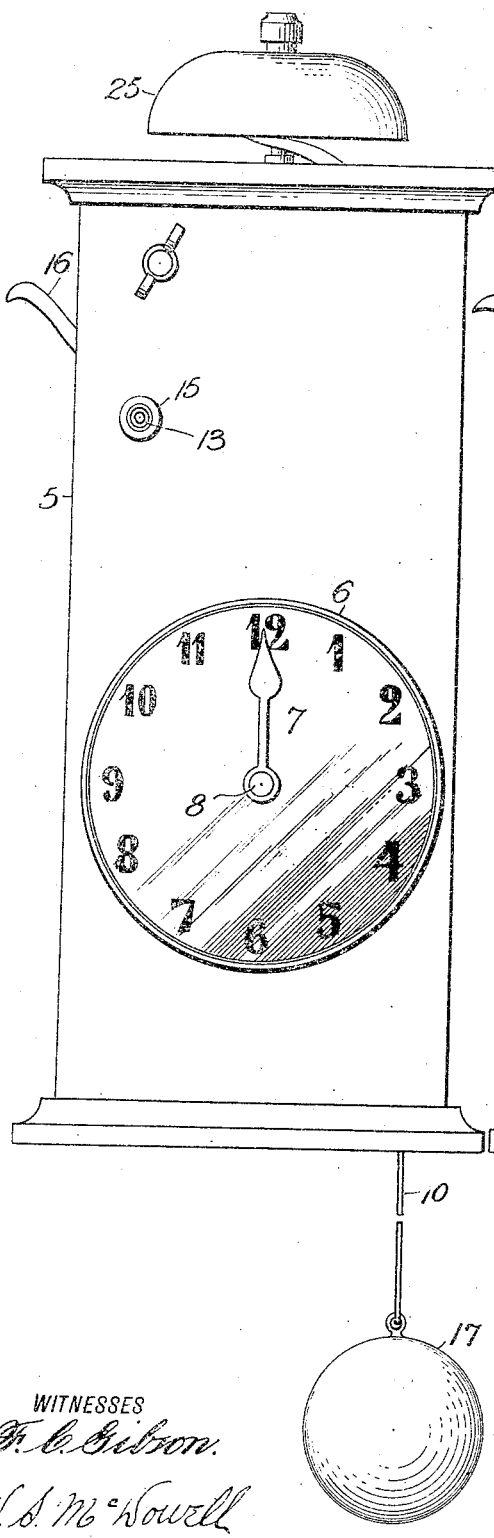
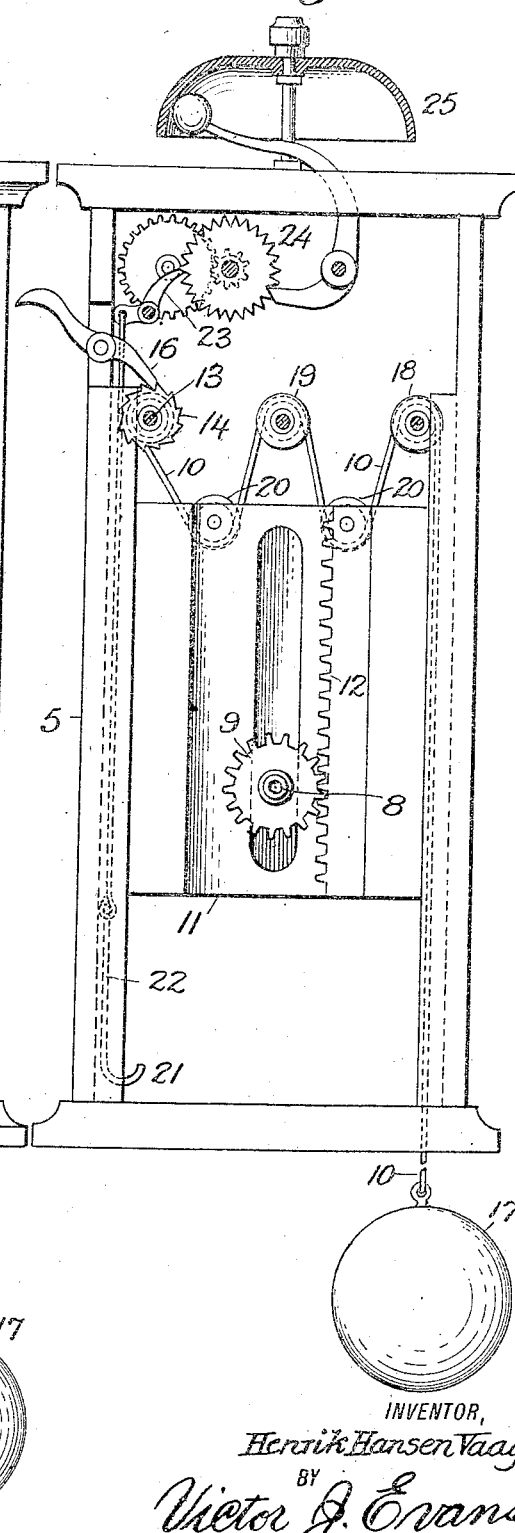

HENRIK HANSEN VAAGE, OF BROOKLYN, NEW YORK.

WATER-GAGE.

939,763.  Specification of Letters Patent.  Patented Nov. 9, 1909.

Application filed January 29, 1909. Serial No. 475,055.

*To all whom it may concern:*

Be it known that I, HENRIK HANSEN VAAGE, a subject of the King of Norway, residing at Brooklyn, in the county of Kings and State of New York, have invented new and useful Improvements in Water-Gages, of which the following is a specification.

This invention relates to water gages and its object is to provide a cheap and simple device for vessels or water fronts which may be adjusted to automatically give a signal when the water reaches a predetermined height as will be more fully described in the following specification set forth in the claims and shown in the drawings where:

Figure 1 is a front elevation of the device. Fig. 2 is a similar view but with the front wall removed.

The device is adapted to be secured within the hold of a vessel or on a wall over a body of water which rises and falls, and its operating mechanism is contained within a casing 5. On the front face of the case is a dial 6 over which passes a hand 7, carried by the arbor 8 journaled in the front and rear walls and having about midway of its length the pinion 9. Suspended by the cord 10 within the case is a weight 11 with gear teeth 12 that mesh with the pinion 9, the cord being at one end attached to a shaft 13 having a ratchet wheel 14 and thumb knob 15, the latter on the outside of the casing, while a pawl 16 is pivoted in one of the sides of the case and retains the ratchet wheel 14 against rotation in one direction so that the cord will not unwind from the shaft. The other end of the cord carries a float 17 to make contact with the water and is raised thereby allowing the weight to descend, as the float is the heavier of the two and otherwise keeps the weight in its elevated position. The descent of the weight and its gear teeth 12 causes the pinion 9 and its shaft to rotate and the hand 7 sweeps over the dial and registers the rise of the water above its normal. In connecting the cord 10 with the weight it is passed over the stationary pulleys 18 and 19 in the upper part of the casing and around the two pulleys 20 on the weight 11 thus allowing considerably more movement for the float than for the weight and if more movement be deemed necessary for the float additional pulleys may be employed to secure a smaller movement for the weight. As the hand completes its movement over the dial face and the weight reaches the bottom of the casing the weight comes in contact with an arm 21 on a slide 22 which is connected with a detent 23 locking the clock work 24 and by releasing the detent the bell 25 is rung announcing a rise of twelve feet.

In case that it is desired to register a rise of less than twelve feet the arbor 13 is rotated by means of the thumb knob 15 so that the cord 10 is let out permitting the weight to descend about half its course, the balance of its movement will be permitted by the float when it will strike the arm 21 and sound the alarm. Other adjustments may be secured by the winding or unwinding of the cord on the arbor and the hand 7 will clearly designate the distance the float is to move before the alarm sounds. A pawl 16 is used to lock the ratchet 14 at any desired point or release it and allow the cord to be unwound. When the clock work is wound up the device makes a cheap and simple means for detecting the rise of liquids and may be used in all places where it is necessary to know when a certain height is reached.

It is obvious that various modifications and changes of the parts may be resorted to or they may be otherwise arranged, without departing from the essential features shown.

What I claim as new and desire to secure by Letters Patent is:

1. In a liquid gage, the combination with a float, of a shaft, a cord permanently secured to the shaft at one end and carrying the float at the other, of a weight suspended from the cord, a dial, a hand for the same with a shaft having a pulley which is rotated by the weight on movement thereof, clock work, a signal operated by the clockwork, and a projecting arm to control the clock and operated by the descending weight.

2. In a liquid gage, the combination with a float, of a shaft, a cord secured to one end to the shaft and carrying the float at the other, a weight hung on the cord, a dial, a hand journaled in the dial and carrying a pinion, gear teeth on the weight to operate the pinion, a signal, clock work for operating the signal, and an arm for controlling the clock work and operated by the weight as it descends.

3. In a liquid gage, the combination with a float, of a shaft, a cord carrying same and having one end permanently secured to the shaft, a weight with gear teeth hung on the cord, an indicator with a pinion operated by the teeth on the weight, a signal, clock work normally locked and adapted to operate the signal, a pawl normally locking the clock-work and a rod with an arm to release the clockwork when the weight descends.

4. In a liquid gage, the combination with a float, of a cord attached to same, an arbor carrying the other end of the cord, a weight hung on the cord and having gear teeth, an indicator with a pinion meshing with the gear teeth of the weight, a dial with figures, a signal bell and operating clock work, means normally locking the clock work and means operated by the weight for releasing the clockwork when the float allows the weight to descend a certain distance.

5. In a liquid gage, the combination with a float, of a cord carrying same, pulleys for guiding the cord, an arbor with means for winding thereon the other end of the cord, a weight provided with gear teeth hung on the cord, a pinion with an indicator operated by the gear teeth, clock-work, a signal bell adapted to be rung by the clock work, a trip normally locking the clock work, an arm in the path of the weight as it falls and connected with the trip and a ratchet and pawl to prevent the arbor from unwinding the cord.

In testimony whereof I affix my signature in presence of two witnesses.

HENRIK HANSEN VAAGE.

Witnesses:
JAMES F. DUHAMEL,
MAE W. CLINTON.